US009747552B2

(12) United States Patent
Clark et al.

(10) Patent No.: US 9,747,552 B2
(45) Date of Patent: *Aug. 29, 2017

(54) USING COHORTS TO INFER ATTRIBUTES FOR AN INPUT CASE IN A QUESTION ANSWERING SYSTEM

(71) Applicant: International Business Machines Corporation, Armonk, NY (US)

(72) Inventors: Adam T. Clark, Mantorville, MN (US); Jeffrey K. Huebert, Rochester, MN (US); Aspen L. Payton, Byron, MN (US); John E. Petri, St. Charles, MN (US); Richard J. Stevens, Monkton, VT (US); Kathryn L. Whaley, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/658,973

(22) Filed: Mar. 16, 2015

(65) Prior Publication Data

US 2016/0247073 A1 Aug. 25, 2016

Related U.S. Application Data

(63) Continuation of application No. 14/626,052, filed on Feb. 19, 2015.

(51) Int. Cl.
*G06N 5/04* (2006.01)
*G06F 17/30* (2006.01)

(52) U.S. Cl.
CPC ........... *G06N 5/04* (2013.01); *G06F 17/3043* (2013.01)

(58) Field of Classification Search
CPC .................................................. G06N 5/04
USPC .................................................. 706/11
See application file for complete search history.

(56) References Cited

U.S. PATENT DOCUMENTS

| 5,908,383 | A | 6/1999 | Brynjestad |
|---|---|---|---|
| 8,126,736 | B2 | 2/2012 | Anderson et al. |
| 2006/0281977 | A1 | 12/2006 | Soppet |
| 2008/0208914 | A1 | 8/2008 | Navani |
| 2011/0201900 | A1 | 8/2011 | Zhang et al. |

(Continued)

OTHER PUBLICATIONS

Fukumoto et al ("Interactive Document Expansion for Answer Extraction of Question Answering System" 2013).*

(Continued)

*Primary Examiner* — Lut Wong
(74) *Attorney, Agent, or Firm* — Martin & Associates, LLC; Bret J. Petersen

(57) ABSTRACT

A cohort analysis mechanism analyzes cohorts to infer one or more additional attributes for an input case to provide a refined input case to answer a question in a question answering system. The refined input case is then used to answer a question in the question answering system. The refined input case can be used in a traditional question answering flow or in a flow that again uses cohort analysis to extract relevant data to answer the question. The cohort analysis mechanism analyzes cohorts to find common attributes in the cohorts and then determines whether to infer the common attributes into the refined input case. The cohort analysis mechanism may determine to dialog with a user to confirm an inferred attribute.

9 Claims, 7 Drawing Sheets

(56) References Cited

U.S. PATENT DOCUMENTS

| 2011/0251243 A1 | 10/2011 | Tucker et al. |
| 2012/0185266 A1 | 7/2012 | Trifunov |
| 2013/0085773 A1 | 4/2013 | Yao et al. |
| 2013/0085980 A1 | 4/2013 | Alemi |
| 2013/0185231 A1 | 7/2013 | Baras et al. |

OTHER PUBLICATIONS

Lally et al ("WatsonPaths: Scenario-based Question Answering and Inference over Unstructured Information" Sep. 2014).*

Roitman et al ("Exploratory Search Over Social-Medical Data" 2011).*

Celi et al ("Dynamic Clinical Data Mining: Search Engine-Based Decision Support" 2014).*

Clark et al., "Using Cohorts to Infer Attributes for an Input Case in a Question Answering System" U.S. Appl. No. 14/626,052, filed Feb. 19, 2015.

List of IBM Patents or Patent Applications Treated as Related.

Clark et al., "Using Cohorts in a Question Answering System" U.S. Appl. No. 14/489,124, filed Sep. 17, 2014.

Clark et al., "Using Cohorts in a Question Answering System" U.S. Appl. No. 14/492,661, filed Sep. 22, 2014.

Fukumoto et al., Interactive Document Expansion for Answer Extraction of Question Answering System, 17th Int'l Conference in Knowledge Based and Intelligent Information and Engineering Systems, 2013.

Lally et al., "WatsonPaths: Scenario-based Question Answering and Inference over Unstructured Information", Sep. 17, 2014.

Ahmed et al., "Case-based Reasoning for Diagnosis of Stress using Enhanced Cosine and Fuzzy Similarity", Transactions on Case-Based Reasoning for Multimedia Data, vol. 1, No. 1, p. 3-19, 2008.

* cited by examiner

USING COHORTS TO INFER ATTRIBUTES FOR AN INPUT CASE IN A QUESTION ANSWERING SYSTEM

BACKGROUND

1. Technical Field

This invention generally relates to computer question answering systems, and more specifically relates to using cohorts to infer additional attributes for an input case to provide a refined input case in the question answering system.

2. Background Art

A significant purpose for computer systems is the retrieval of relevant information or documents from a store of knowledge. The typical information retrieval system provides a document or file in response to a specific query or link. Question Answering (QA) is a specific type of information retrieval that deals with returning information in response to a natural language question. A QA response attempts to return a specific answer such as a word or phrase to a question such as "who", "where" or "what". One example of a QA system is the Deep Question Answering system, called "Watson", developed by International Business Machines (IBM) Corporation of Armonk, N.Y. A user may submit a natural language question (also referred to as a case) to Watson, which will then provide an answer to the question based on an analysis of a corpus of information.

A QA system like Watson has application in the medical field due to the ability to process and relate large amounts of information. For example, QA can determine an appropriate cancer treatment for a patient based on the patient's medical history from knowledge stored in the database. While QA can identify knowledge stored in a large corpus using natural language processing to interpret the English language, it is not designed to provide an answer when knowledge is non-existent, such as when the corpus does not contain sufficient knowledge to answer the question. When a question is posed about a topic that is not available in a corpus, typically QA is at a loss to confidently answer the question.

BRIEF SUMMARY

A cohort analysis mechanism analyzes cohorts to infer additional attributes for an input case to provide a refined input case to answer a question in a question answering system. The refined input case is then used to answer a question in a question answering system. The refined input case can be used in a traditional question answering flow or in a flow that again uses cohort analysis to extract relevant data to answer the question. The cohort analysis mechanism analyzes cohorts to find common attributes in the cohorts and then determines whether to infer the common attributes into the refined input case. The cohort analysis mechanism may determine to dialog with a user to confirm an inferred attribute.

The foregoing and other features and advantages of the invention will be apparent from the following more particular description of preferred embodiments of the invention, as illustrated in the accompanying drawings.

BRIEF DESCRIPTION OF THE SEVERAL VIEWS OF THE DRAWING(S)

The preferred embodiments of the present invention will hereinafter be described in conjunction with the appended drawings, where like designations denote like elements, and:

DETAILED DESCRIPTION

The disclosure and claims herein relate to a cohort analysis mechanism that analyzes cohorts to infer additional attributes for an input case to provide a refined input case. The refined input case is then used to answer a question in a question answering system. The refined input case can be used in a traditional question answering flow or in a flow that again uses cohort analysis to extract relevant data to answer the question. The cohort analysis mechanism analyzes cohorts to find common attributes in the cohorts and then determines whether to infer the common attributes into the refined input case.

Figure 1:
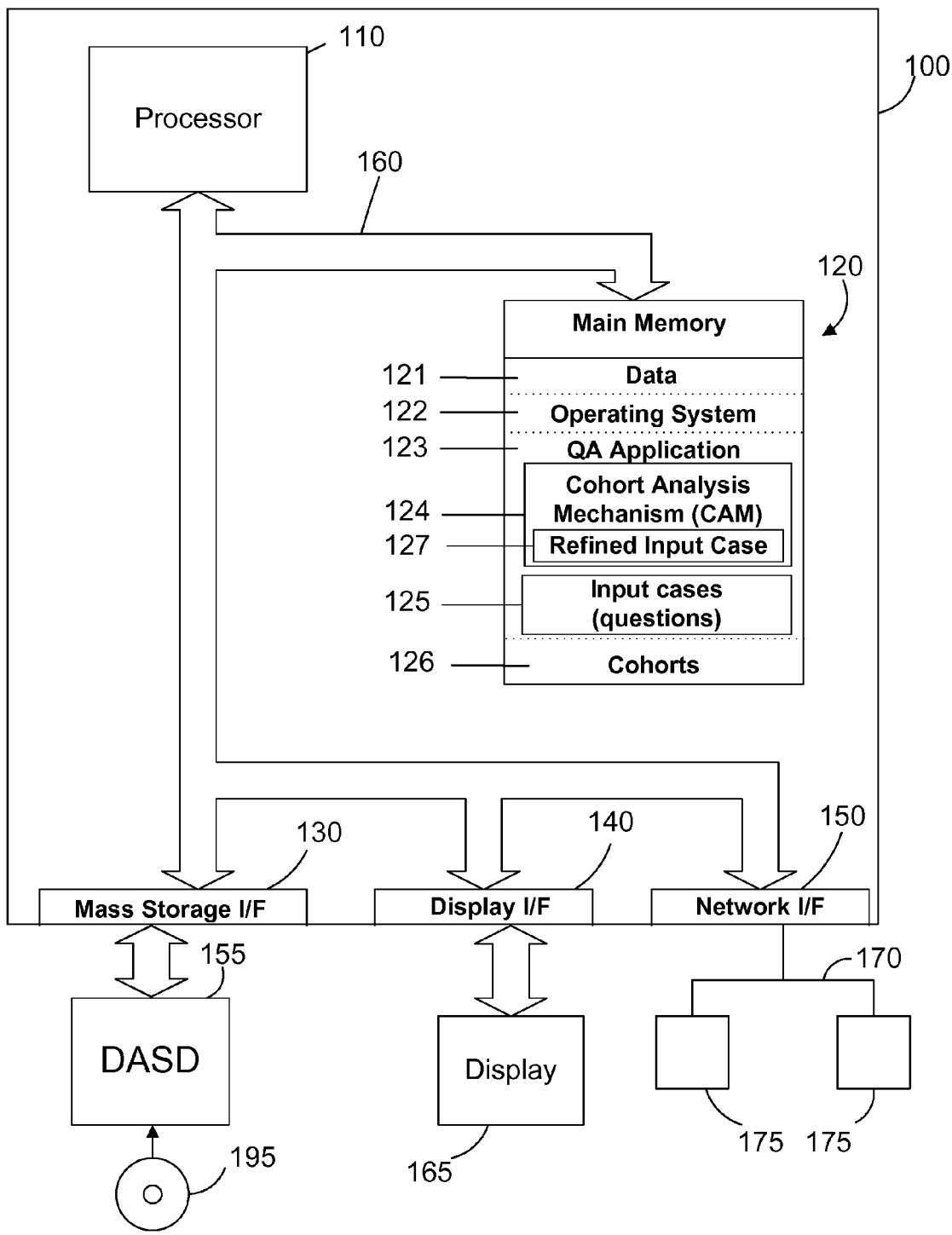
FIG. 1 illustrates a block diagram of a computer system apparatus with a question answering application having a cohort analysis mechanism as described herein.

Referring now to FIG. 1, a computer system 100 is one suitable implementation of an apparatus in accordance with the preferred embodiments of the invention. Computer system 100 represents a computer system such as a Power System by International Business Machines Corporation (IBM). However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises a processor 110, a main memory 120, a mass storage interface 130, a display interface 140, and a network interface 150. These system components are interconnected through the use of a system bus 160. Mass storage interface 130 is used to connect mass storage devices such as a direct access storage device (DASD) 155 to computer system 100. One specific type of direct access storage device 155 is a readable and writable CD RW drive, which may store data to and read data from a CD RW 195. Alternatively, the DASD may be a storage device such as a magnetic disk drive or a solid state disk drive.

Main memory 120 in accordance with the preferred embodiments contains data 121, and an operating system 122. Data 121 represents any data that serves as input to or output from any program in computer system 100. Operating system 122 represents an appropriate multitasking operating system known in the industry such as "IBM i", AIX (Advanced Interactive eXecutive) or Linux; however, those skilled in the art will appreciate that the spirit and scope of the present invention is not limited to any one operating system. The main memory 120 also includes a Question Answering (QA) application 123 that includes a cohort analysis mechanism (CAM) 124. The CAM finds and analyzes cohorts 126 to infer attributes to generate a refined input case 127 as described further below.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, QA application 123, the CAM 124, questions 125, cohorts 126 and the refined input case 127 are shown to reside in main memory 120, those skilled in the art will recognize that these items are not necessarily all completely contained in main memory 120 at the same time. It should also be noted that the term "memory" is used herein to generically refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, display interface 140, network interface 150, and system bus 160.

Although computer system 100 is shown to contain only a single processor and a single system bus, those skilled in the art will appreciate that the cohort analysis mechanism may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

Figure 2:
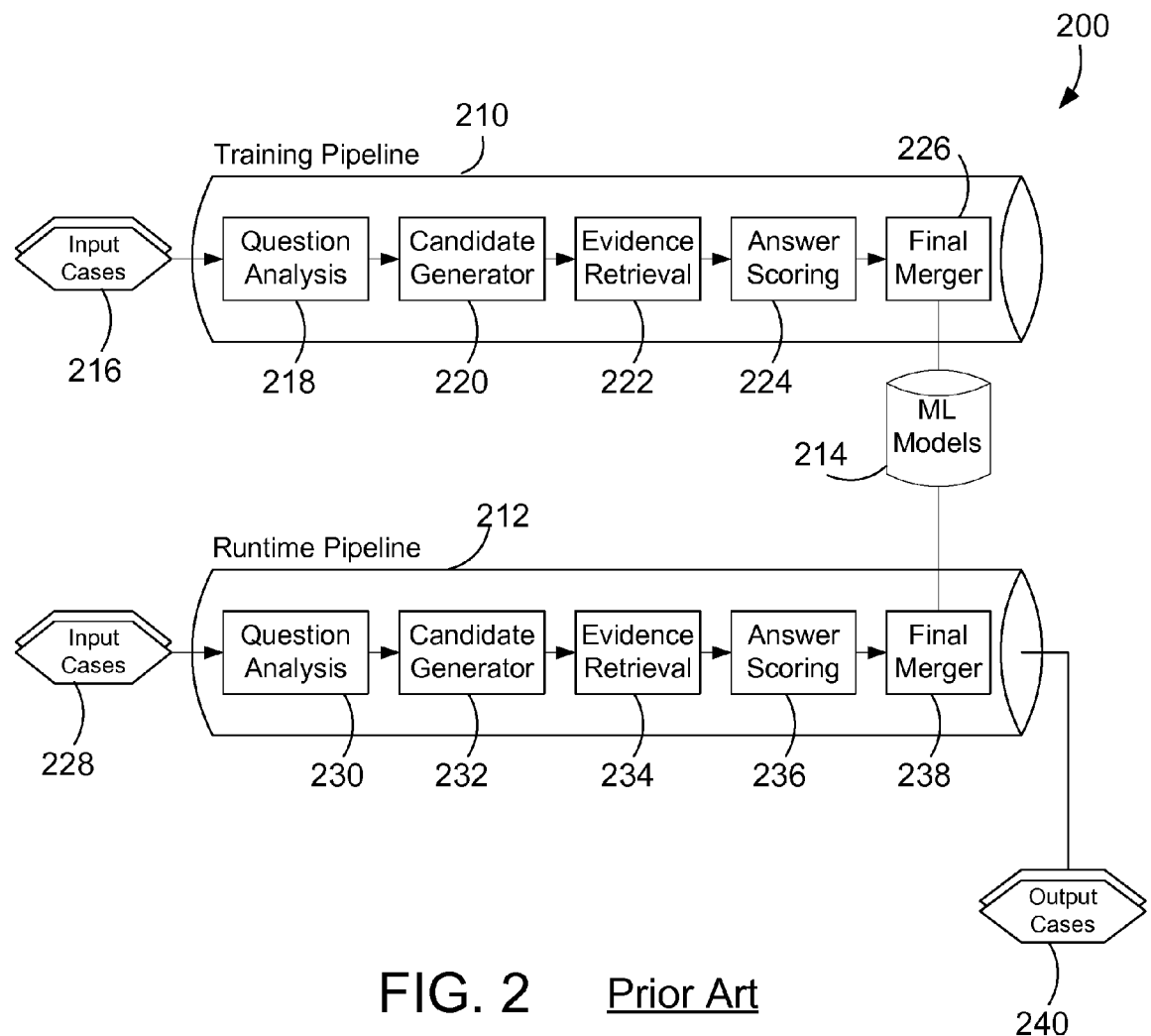
FIG. 2 illustrates a block diagram of a question answering system as known in the prior art.

FIG. 2 illustrates a simplified block diagram of a question answering system 200 as known in the prior art. In this example, the question answering (QA) system 200 is divided into a training pipeline 210 and a runtime pipeline 212. The training pipeline is used to train the system and build machine learning (ML) models 214. The ML models 214 are then used in the runtime pipeline 212. To train the QA system 200, questions referred to as input cases 216 are applied to a question analysis block 218. During question analysis the system attempts to understand what the question is asking and performs the initial analyses that determine how the question will be processed by the rest of the system. After question analysis, the system passes the question to the candidate generator 220. In the candidate generator 220, a search is performed to find as much potentially answer-bearing content as possible. Techniques appropriate to the kind of search results are applied to the search results to generate candidate answers. Search results from the candidate generator 220 are passed to the evidence retrieval block 222. To better evaluate each candidate answer, the system gathers additional supporting evidence. This evidence is passed to the answer scoring block 224. In the answer scoring block 224 the bulk of the deep content analysis is performed. Scoring algorithms determine the degree of certainty that retrieved evidence supports the candidate answers. The QA system may include many different components, or scorers, that consider different dimensions of the evidence and produce a score that corresponds to how well evidence supports a candidate answer for a given question. After answer scoring is the final merger block 226. The goal of final merging is to evaluate the hundreds of hypotheses based on potentially hundreds of thousands of scores to identify the single best-supported hypothesis given the evidence and to estimate its confidence, which is the likelihood it is correct. After answer scoring the ML models are created. The ML models 214 assign weights to the system's various analysis programs according to how well they predict correct answers for the case.

Again referring to FIG. 2, the question answering system 200 further includes a runtime pipeline 212. The runtime pipeline is in many ways similar to the training pipeline 210. The runtime pipeline inputs cases 228 to a question analysis block 230 and the question analysis block feeds a candidate generator block 232. Similar to the training pipeline, the runtime pipeline includes an evidence retrieval block 234, an answer scoring block 236 and a final merger block 238. The final merger block 238 uses the ML models 214 created by the training pipeline 210. The runtime pipeline 212 produces output cases 240.

Figure 3:
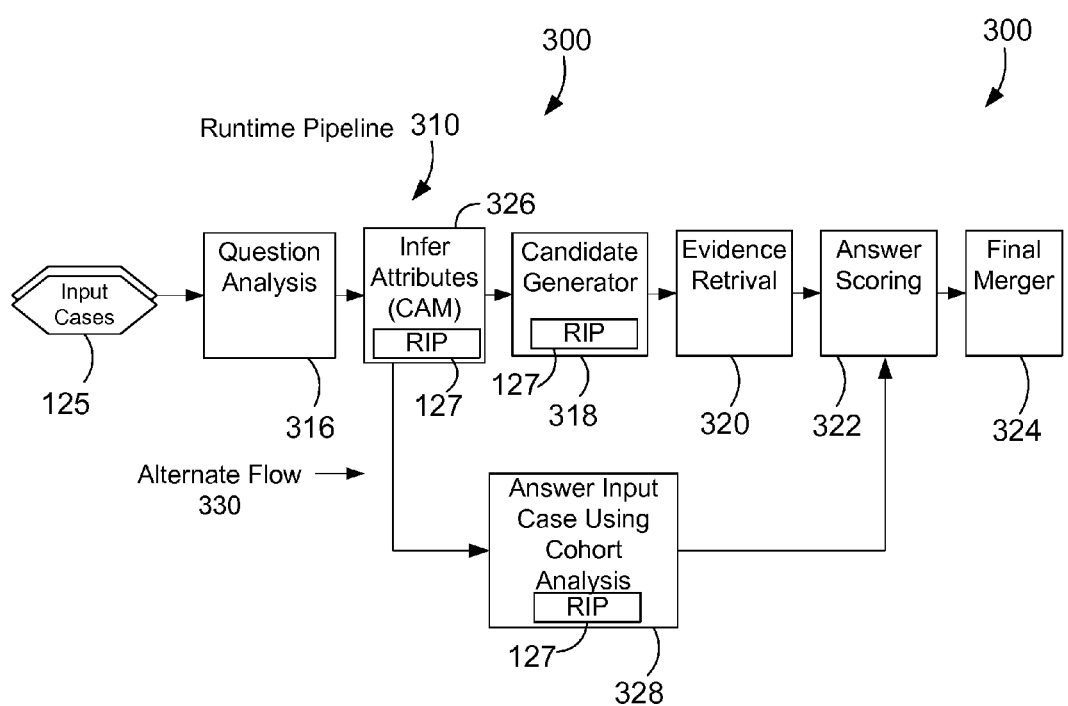
FIG. 3 illustrates a block diagram of a question answering system using a cohort analysis mechanism as described herein to infer an attribute.

FIG. 3 illustrates a block diagram representing an example of a question answering system 300 that utilizes cohort analysis as claimed herein. The question answering system 300 may also incorporate a training pipeline 210 as described in FIG. 2, however a training pipeline is not shown here for simplicity. The question answering system 300 includes a runtime pipeline 310 with input cases 125 to the pipeline in a similar manner as the prior art. The runtime pipeline 310 includes blocks 316, 318, 320, 322, 324 that are also similar to the respective blocks in the prior art discussed above. Question analysis block 316 may also be similar to the prior art but may contain additional features as described below. In addition the runtime pipeline 310 includes blocks 326 and 328 as described further herein.

The runtime pipeline at some point determines whether to use cohort analysis to infer attributes and generate a refined input case 127. In the illustrated example in FIG. 3, this determination to use cohort analysis is done in block 326 by the CAM 124 (FIG. 1). Alternatively the determination to use cohort analysis could be part of block 316. The determination to use cohort analysis to infer attributes may include input from a system administrator. The determination may also depend on the type of question and the type of data available to the system. For example, cohort analysis may be attempted for questions of a specific type where sufficient data is available. For example, data in the corpus may be determined to be sufficient where there are cohorts in the corpus with at least 90% of the attributes identified in the input case or where the most critical attributes are in the cohort regardless of the total percentage of attributes. If there is insufficient data cohort analysis would be aborted. If there is sufficient data the case would be presented to the cohort analysis mechanism (CAM) 124. The CAM 124 then uses cohort analysis to infer attributes and generate a refined input case 127 as described herein.

The input cases 125 are applied to a question analysis block 316 and processed similar to the prior art. After question analysis, the CAM 124 in block 326 determines whether to use cohort analysis to infer attributes from the question or input case. If the system determines not to use cohort analysis then it would proceed as known in the prior art shown in FIG. 2. If the system determines to use cohort analysis to infer attributes in question analysis, the CAM infers attributes using cohort analysis to provide a refined input case 127 as described further herein. The refined input case from the CAM is then passed to the candidate generator 318 to search for candidates for the refined input case. Search results from the candidate generator 318 are passed to the evidence retrieval block 320. Retrieved evidence is passed to the answer scoring block 322. After evidence scoring is the final merger block 324. Blocks 318, 320, 322 and 324 may perform in a similar way to the prior art discussed with respect to FIG. 2. These blocks also work in conjunction with the cohort analysis mechanism to use cohort analysis to answer a question as described herein.

In a previous application, filed on Sep. 17, 2014, Ser. No. 14/489,124 by the same inventors as the instant application, a method was disclosed to use cohort analysis to answer a question in a question answering system. This previously disclosed method can be used in conjunction with the present invention which is represented by alternative flow 330 shown in FIG. 3. In the alternative flow 330, after generating a refined input case 127, the system may send the refined input case to block 328 and proceed to again use cohort analysis to answer the refined input case 127 using the method of the previously filed application. In this method in block 328, cohorts are first identified using the refined input case 127. The system then extracts data from the cohorts, combines and ranks answers from the cohorts, gathers evidence and then answers the question with the aggregated evidence as described in the previously filed application. After using cohort analysis to answer the question, the answer can be sent to the answer scoring block 322. The answer scoring block 322 can optionally use the answer from the CAM 124 combined with answers using conventional QA analysis from evidence retrieval block 320 for the same input case to answer the question.

As introduced above, the input case or question is analyzed to determine if cohort analysis can be used. Part of this analysis may include determining if the question deals with an entity that has available cohorts. As used herein, a cohort is an entity for which there is data for similar entities in the corpus of data available to the QA system. Entities for which cohort analysis could be applied may include patients, people in general, animals, computer components, etc. Identifying cohorts entails finding entities in the corpus of data available to the QA system that are similar to the one in the input case. The CAM matches attributes from the question or input case to similar entities available in the corpus of data using "fuzzy" matching. Fuzzy matching may be accomplished, for example, with a threshold percentage. Thus cohorts are similar entities that meet a threshold of attributes similar to the input case where the threshold may be a reference percentage. The cohorts may then be divided into relative strengths such as "strong", "medium" and "weak" for different percentage thresholds. The relative strength of the cohorts can then be used to score the answers and evidence.

Figure 4:
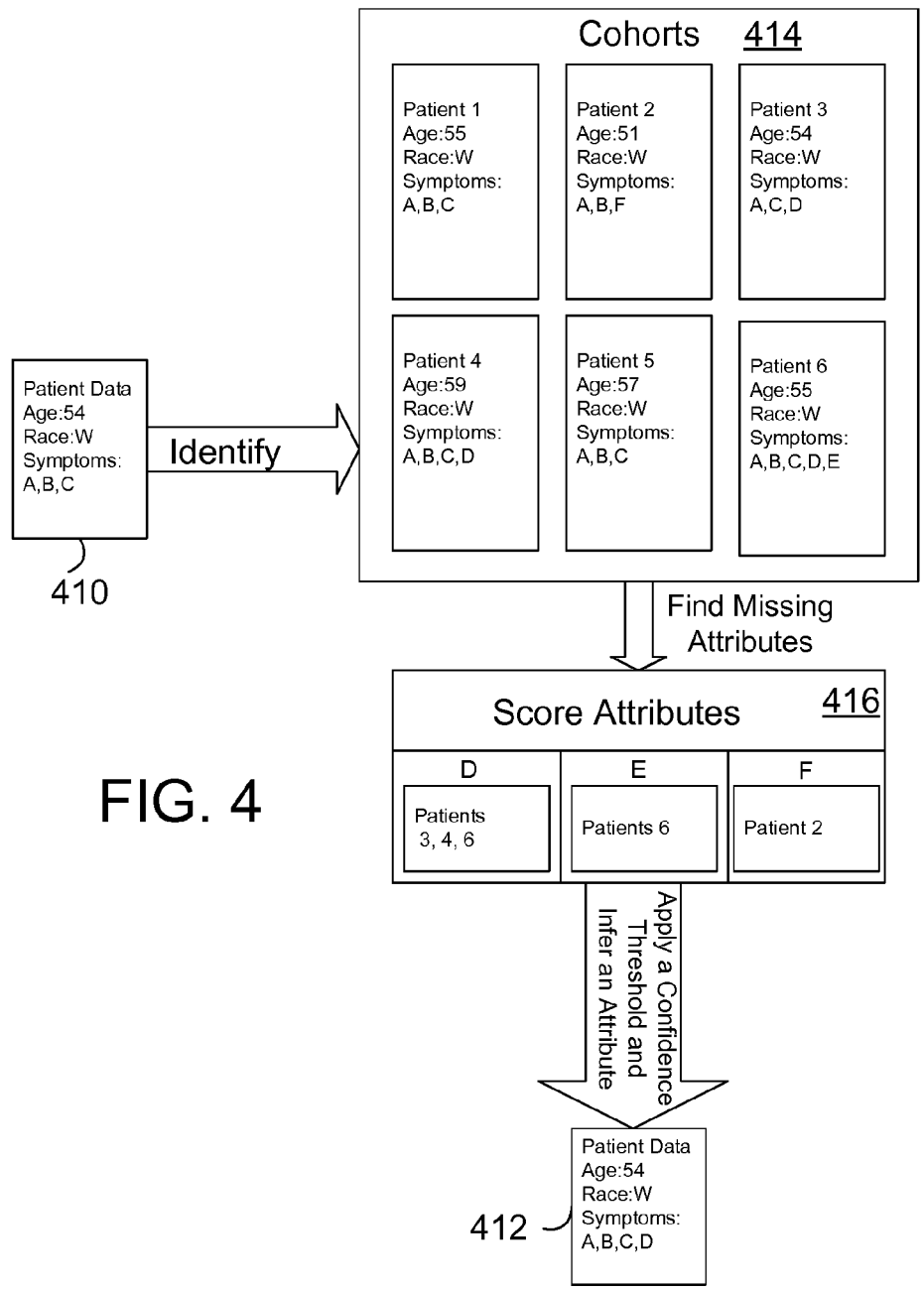
FIG. 4 illustrates a block diagram of an example using a cohort analysis mechanism as described herein to infer attributes.

FIG. 4 illustrates a simplified example of cohort analysis by the CAM 124 (FIG. 2) to infer attributes for an input case 410 to provide a refined case 412. The refined input case 412 can then be used to answer a question in a question answering system as described herein. In this example, we assume the question is "What is the best treatment for a 54 year old, white male with symptoms A, B and C?" The CAM determines that the question concerns a medical patient that has sufficient data in the corpus of the data available to use cohort analysis. The first step is to identify cohorts that are similar to the one in the input case 410. The CAM identifies cohorts 414 for the patient of the input case 410. Cohorts 414 represent an example of cohorts 126 in FIG. 1. The cohorts 414 include 6 patients that have similar age, race and symptoms as the input case 410. In this example a small number of cohorts are shown for simplicity. However, in actual use the number of cohorts would preferably be much larger to get more accurate results. The CAM then finds missing attributes in the input case 410 by comparing attributes of the cohorts 414. In this example, the CAM identifies symptoms "D", "E" and "F" as missing attributes from the input case compared to the cohorts.

Again referring to FIG. 4 after identifying the missing attributes, the CAM then scores the missing attributes. In this example the CAM scores the missing attributes as shown in block 416. In this example, the CAM finds the number of patient cohorts that have the missing attributes (symptoms) of the input case. As illustrated, the CAM has identified patients 3, 4 and 6 having the missing attribute or symptom D. Similarly, patient 6 was found to have the missing symptom E and patient 2 was found to have the missing symptom F. The CAM would then score the symptom D as having the highest consistency in the identified cohorts. The CAM then applies confidence thresholds to the scored attributes to infer attributes for the input case. For example, the confidence threshold may be determined by finding the percentage of cohorts that have the missing attribute and comparing it to a predetermined threshold or a threshold provided by a user. In this example, the CAM uses a confidence threshold such that symptom D is inferred to the input case to produce a refined input case 412 as shown that includes symptom D in the patient data.

As described above with reference to FIG. 4, the CAM applies confidence thresholds to the scored attributes to infer attributes for the input case. In addition, the CAM may determine to dialog with a user to determine whether to infer the attributes. In the above example, the CAM may determine to dialog with the user to ask the user whether to infer symptom D. This determination to dialog with the user may be done when the confidence level for the inferred attribute does not meet a particular threshold. For example, if the confidence level is sufficiently high, for example above 70%, then attribute would be inferred. If however the confidence level is lower, for example above 50% but below 70% the attribute will only be inferred into the input case after dialoging with the user. In the above example, the user may be asked to answer a question such as the following: "Symptom D appears to be a common symptom for patients having similar problems as the input case. Did the input case have or may have had symptom D?" If the user affirms then symptom D is added to the input case. The CAM could also score the attributes to infer an attribute for the input case based on the size of the cohorts. For example, if only 10 patients are in the cohort then the CAM might require a 90% confidence to be sufficient to infer an attribute. However, with a larger sample size the CAM could accept a lower confidence threshold such as 70%.

After the CAM provides a refined input case, the refined input case can be passed to the candidate generator 318 (FIG. 3). After this point in the runtime pipeline shown in FIG. 3, the flow to answer the question can be essentially as done in the prior art. Alternatively, the refined input case 412 can be sent to block 328 (FIG. 3) and cohort analysis can be used to answer the question in a manner previously disclosed. Using cohort analysis to answer the question includes the steps of identifying cohorts for the entity of the question, extracting data from the cohorts that were identified, combining and ranking answers from the cohorts, gathering evidence and then answering the question with the aggregated evidence. After using cohort analysis to answer the question, the answer can be sent to the answer scoring block 322. The answer scoring block 322 can optionally use the answer from the CAM 124 combined with answers using conventional QA analysis from evidence retrieval block 320 for the same input case to answer the question. Extracting data from the cohorts may include potential answers for the question and the associated evidence. For example, common answers are combined and ranked according to occurrence in the data. The ranking can then be used to gather the statistically most significant evidence to answer the question and give a confidence score for the answer. The answers can be scored by a confidence in the answer. Confidence in cohort attributes is a direct result of statistical analysis of the cohesion of values for the cohort. The confidence for an answer is the statistical likelihood that the most frequent value for that attribute is correct given the size of the cohort and the number of cases in the cohort with the same value.

Figure 5:
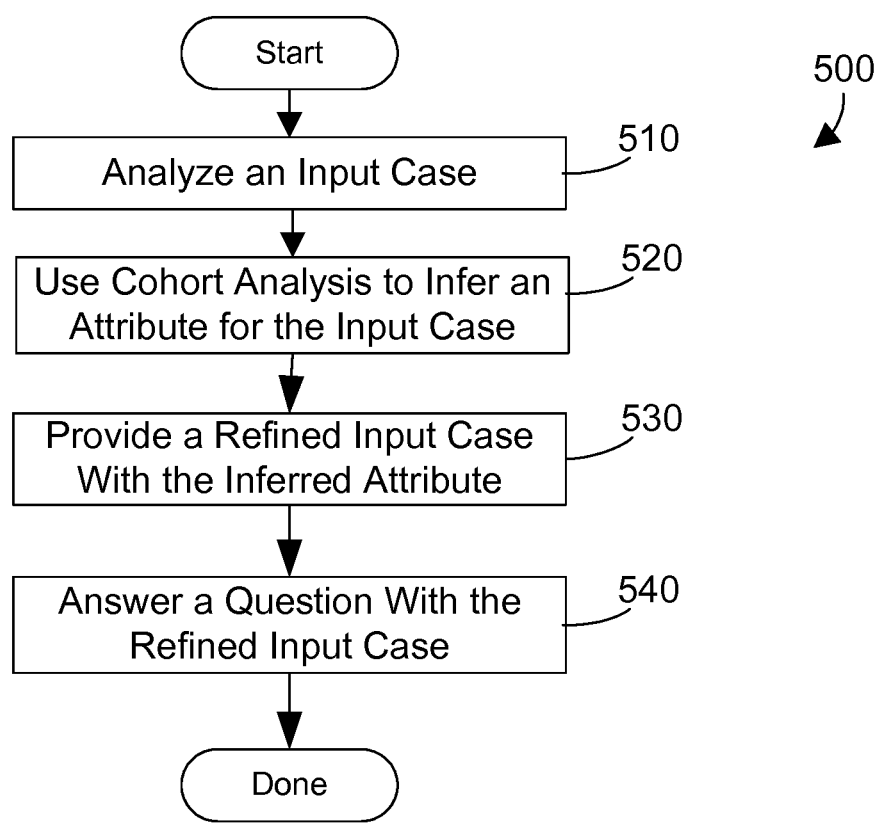
FIG. 5 is a flow diagram of a method for analyzing cohorts to infer an attribute to answer a question in a question answering system.

Referring now to FIG. 5, a flow diagram shows a method 500 for using cohort analysis to infer attributes in a question answering system. The steps of method 500 are preferably performed by the cohort analysis mechanism (CAM) 124 as part of a question answering system as described above. First analyze the input case or question (step 510). Next, use cohort analysis to infer attributes for the input case (step 520). Provide a refined input case with the inferred attributes (step 530). Answer the input case or question with the refined input case (step 540). The method 500 is then done.

Figure 6:
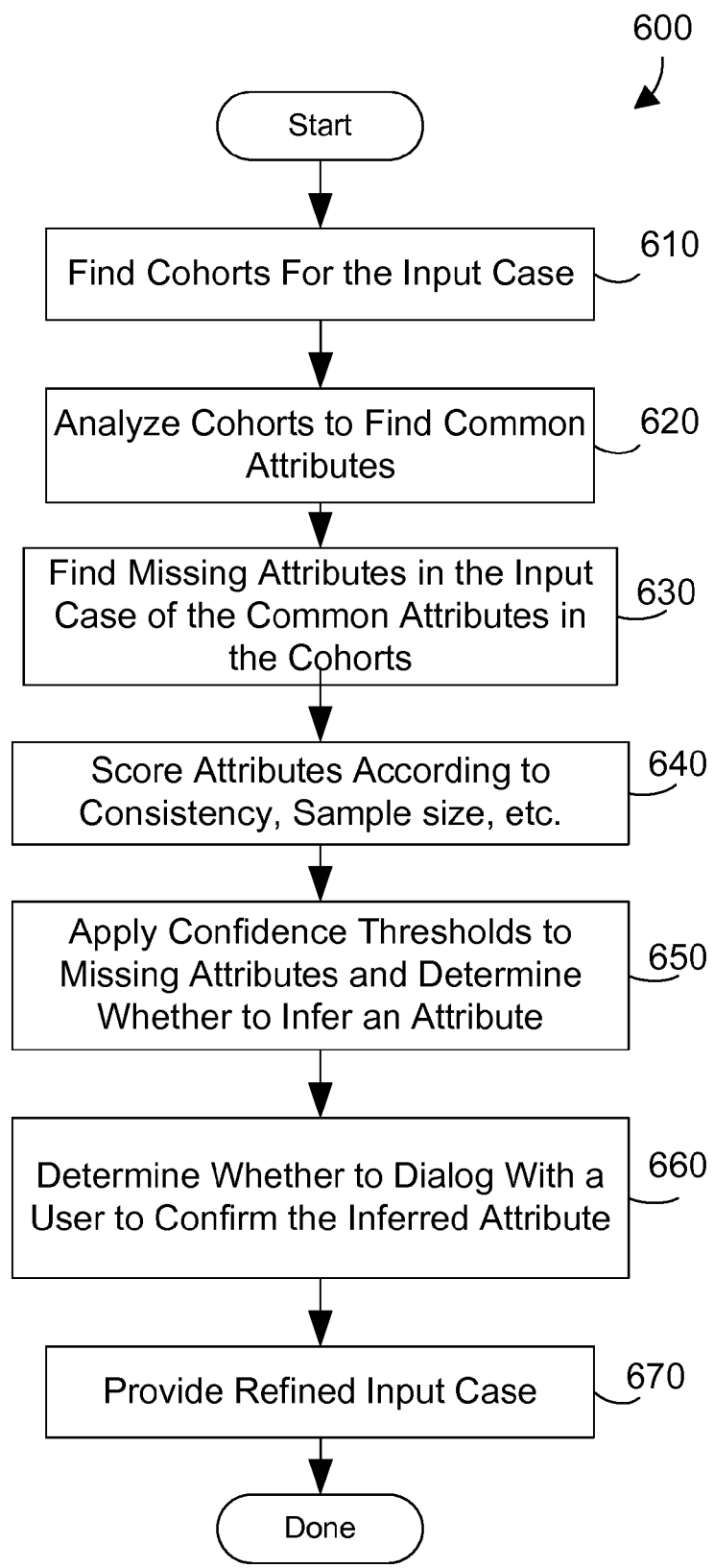
FIG. 6 is a flow diagram of an example method for step 520 in FIG. 5 for using cohort analysis to infer attributes for an input case in a question answering system.

Referring now to FIG. 6, a flow diagram shows a method 600 for using cohort analysis to infer attributes in a question answering system. The steps of method 600 are preferably performed by the cohort analysis mechanism (CAM) 124 as part of a question answering system as described above. First identify cohorts of an entity of the input case or question (step 610). Next, analyze the identified cohorts to find common attributes (step 620). Find missing attributes in the input case from the common attributes in the cohorts (step 630). Score the missing attributes according to consistency, sample size, etc. (step 640). Apply confidence thresholds to the missing attributes and determine whether to infer attributes to the input case (step 650). Alternatively, apply confidence thresholds to the missing attributes and determine whether to dialog with the user to confirm inferred attributes (step 660). Then provide a refined input case with the determined inferred attributes (step 670). The method 600 is then done.

Figure 7:
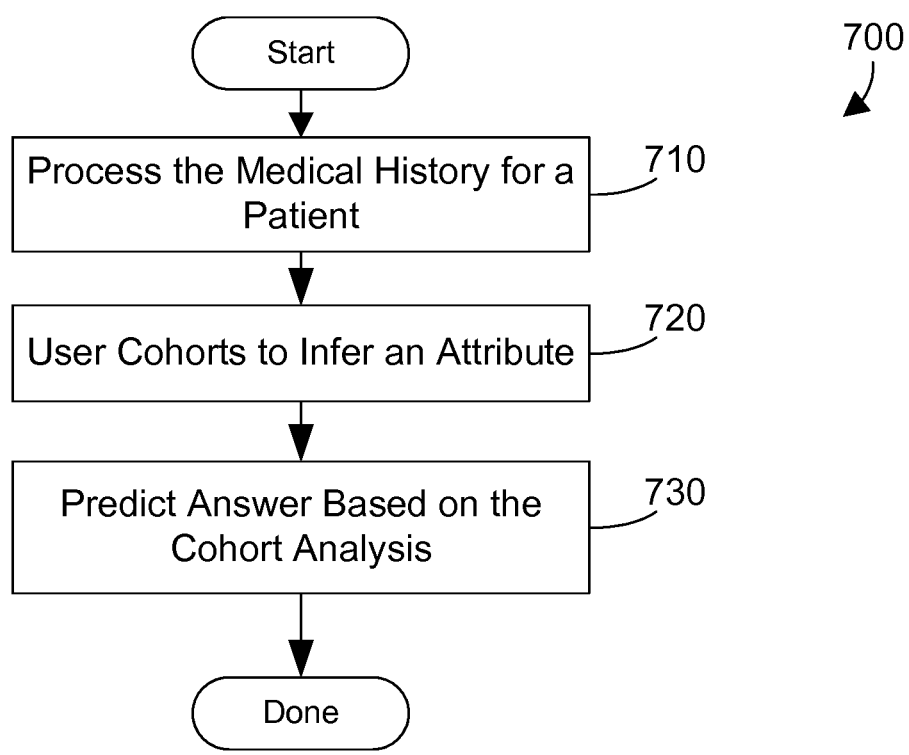
FIG. 7 is an example flow diagram to answer a medical question using cohort analysis.

Referring now to FIG. 7, a flow diagram shows a method 700 for using cohort analysis to answer a question in a question answering system. The steps of method 700 are preferably performed by the cohort analysis mechanism as described above. First process the medical history for a patient (step 710). Use cohorts and the steps of method 500 to perform cohort analysis to infer an attribute for an input case (step 720). Then predict an answer to the input case based on the inferred attribute (step 730). The method is then done.

The present invention may be a system, a method, and/or a computer program product. The computer program product may include a computer readable storage medium (or media) having computer readable program instructions thereon for causing a processor to carry out aspects of the present invention.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The disclosure and claims are directed to a cohort analysis mechanism that uses cohort analysis to infer attributes for an input case in a question answering system.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
at least one processor;
a memory coupled to the at least one processor;
a cohort analysis mechanism residing in the memory and executed by the at least one processor that analyzes an input case representing a question to determine whether cohorts can be used with the input case, wherein the cohorts are similar entities with similar characteristics to an entity of the input case and available in a corpus of data;
wherein the cohort analysis mechanism uses cohort analysis to infer an attribute for the input case by:
determining if the input case has an entity that has available cohorts;
identifying cohorts in the corpus of data using fuzzy matching with a threshold percentage and where the cohorts are similar to the entity in the input case;
analyzing the cohorts to find common attributes in the cohorts;
finding missing attributes for the entity of the input case from the common attributes in the cohorts to infer a missing attribute for the input case;
scoring the missing attributes according to consistency and sample size;
applying confidence thresholds to the missing attributes to determine whether to infer the attribute for the refined input case;
determining whether to dialog with a user to confirm the inferred attribute using a lower threshold compared to inferring the attribute without dialoging with the user;
generating a refined input case that includes the inferred attribute applied to the entity of the input case; and
using the refined input case with the inferred attribute to answer the question.

2. The apparatus of claim 1 wherein the input case is a medical question for a patient and the cohort analysis mechanism processes the medical history of the patient and cohorts, wherein the cohorts comprise a set of other patients with similar attributes, by processing medical histories of other patients to infer the attribute for the refined input case from the cohorts.

3. The apparatus of claim 1 wherein the cohort analysis mechanism is part of a question answering application that answers a natural language question.

4. An apparatus comprising:
at least one processor;
a memory coupled to the at least one processor;
a cohort analysis mechanism residing in the memory and executed by the at least one processor that analyzes an input case representing a question, wherein the input case is a medical question about a patient, and wherein cohorts comprise a set of other patients with similar attributes;
wherein the cohort analysis mechanism uses cohort analysis to infer an attribute for the input case by:
identifying similar patients in the corpus of data where the similar patients are similar to the patient in the input case;
analyzing the similar patients to find common attributes in the similar patients;
scoring the missing attributes according to consistency and sample size;
finding missing attributes for the patient of the input case from the common attributes in the similar patients to infer an attribute for the input case from the missing attributes;
generating a refined input case that includes the inferred attribute from the common attributes of the similar patients; and
using the refined input case with the inferred attribute to answer the question by submitting the refined input case with the inferred attribute to the question answering system.

5. A program product comprising:
a cohort analysis mechanism that analyzes an input case representing a question to determine whether cohorts can be used with the input case, wherein the cohorts are similar entities with similar characteristics to an entity of the input case and available in a corpus of data;

wherein the cohort analysis mechanism uses cohort analysis to infer an attribute for the input case by:

determining if the input case has an entity that has available cohorts;

identifying cohorts in the corpus of data using fuzzy matching with a threshold percentage and where the cohorts are similar to the entity in the input case;

analyzing the cohorts to find common attributes in the cohorts;

finding missing attributes for the entity of the input case from the common attributes in the cohorts to infer a missing attribute for the input case;

scoring the missing attributes according to consistency and sample size;

applying confidence thresholds to the missing attributes to determine whether to infer the attribute for the refined input case;

determining whether to dialog with a user to confirm the inferred attribute using a lower threshold compared to inferring the attribute without dialoging with the user;

generating a refined input case that includes the inferred attribute applied to the entity of the input case; and using the refined input case with the inferred attribute to answer the question; and a non-transistory computer-readable storage medium bearing the cohort analysis mechanism.

6. The program product of claim 5 wherein the input case is a medical question for a patient and the cohort analysis mechanism processes the medical history of the patient and cohorts, wherein the cohorts comprise a set of other patients with similar attributes, by processing medical histories of other patients to infer the attribute for the refined input case from the cohorts.

7. The program product of claim 5 wherein the cohort analysis mechanism is part of a question answering application that answers a natural language question.

8. The program product of claim 5 wherein the cohorts are people.

9. The program product of claim 5 wherein the cohorts are chosen from one of the following: patients, animals, and computer components.

* * * * *